US012589528B2

(12) United States Patent
Fumagalli et al.

(10) Patent No.: US 12,589,528 B2
(45) Date of Patent: Mar. 31, 2026

(54) PRESSURE MOULDING PROCESS AND RELATED PRESSURE MOULDING DEVICE

(71) Applicant: PERSICO S.P.A., Nembro (IT)

(72) Inventors: Andrea Fumagalli, Nembro (IT); Sergio Battista Gastaldi, Nembro (IT); Matteo Radi, Nembro (IT)

(73) Assignee: PERSICO S.P.A., Nembro (IT)

( * ) Notice: Subject to any disclaimer, the term of this patent is extended or adjusted under 35 U.S.C. 154(b) by 255 days.

(21) Appl. No.: 18/570,234

(22) PCT Filed: May 18, 2022

(86) PCT No.: PCT/IT2022/050132

§ 371 (c)(1),
(2) Date: Dec. 14, 2023

(87) PCT Pub. No.: WO2022/264178

PCT Pub. Date: Dec. 22, 2022

(65) Prior Publication Data

US 2024/0286322 A1     Aug. 29, 2024

(30) Foreign Application Priority Data

Jun. 18, 2021     (IT) ........................ 102021000016034

(51) Int. Cl.
*B29C 43/14* (2006.01)
*B29C 43/00* (2006.01)
(Continued)

(52) U.S. Cl.
CPC .......... *B29C 43/146* (2013.01); *B29C 43/003* (2013.01); *B29C 43/18* (2013.01); (Continued)

(58) Field of Classification Search
CPC . B29C 43/003; B29C 2043/147; B29C 43/18; B29C 43/183; B29C 43/184; (Continued)

(56) References Cited

U.S. PATENT DOCUMENTS

2006/0027315 A1     2/2006   Merino Rojo et al.
2006/0220274 A1     10/2006  Dooley et al.
(Continued)

FOREIGN PATENT DOCUMENTS

CN       1799870 A       7/2006
DE   102007031087 A1     1/2009
(Continued)

*Primary Examiner* — Stella K Yi
(74) *Attorney, Agent, or Firm* — FisherBroyles, LLP; Roger L. Browdy; Ronni S. Jillions

(57) ABSTRACT

Pressure moulding process, and related device (100), for manufacturing an article, the process comprising: —providing a substrate (70) made of a composite material comprising a first polymeric material and fibres impregnated with said first polymeric material; —providing a coating sheet (71); —heating said substrate (70) to a temperature of the substrate (70) greater than 160° C.; —subsequently, during a first compression step, compressing under pressure the substrate (70) and the coating sheet (71) between a first conformation surface (1) and a second conformation surface (2) for conforming the substrate (70) and the coating sheet (71) and for firmly fixing the substrate (70) and the coating sheet (71) to each other; —during a second compression step subsequent to the first compression step, compressing under pressure the substrate (70) and the coating sheet (71) between the first (1) and second conformation surface (2) and injecting a second polymeric material in an injection cavity (3) having an outlet mouth (4) onto the first conformation surface (1), wherein a first face of the substrate (70) opposite to the coating sheet (71) is in contact with the first conformation surface (1); —cooling the second polymeric
(Continued)

material for firmly fixing the second polymeric material to the first face of the substrate (70), wherein, during the first compression step, a temperature of the first (1) and second conformation surface (2) is less than 120° C.

11 Claims, 6 Drawing Sheets

(51) Int. Cl.

| | |
|---|---|
| *B29C 43/18* | (2006.01) |
| *B29C 43/40* | (2006.01) |
| *B29C 43/52* | (2006.01) |
| *B29C 45/00* | (2006.01) |
| *B29C 45/14* | (2006.01) |
| *B29C 45/18* | (2006.01) |
| *B29C 45/26* | (2006.01) |
| *B29C 45/62* | (2006.01) |
| *B29K 23/00* | (2006.01) |
| *B29K 105/04* | (2006.01) |
| *B29K 105/08* | (2006.01) |
| *B29K 277/00* | (2006.01) |
| *B29K 309/08* | (2006.01) |
| *B29L 31/30* | (2006.01) |

(52) U.S. Cl.

CPC .............. *B29C 43/40* (2013.01); *B29C 43/52* (2013.01); *B29C 45/0055* (2013.01); *B29C 45/14221* (2013.01); *B29C 45/14786* (2013.01); *B29C 45/26* (2013.01); *B29C 2045/14188* (2013.01); *B29C 2045/1875* (2013.01); *B29C 45/62* (2013.01); *B29K 2023/00* (2013.01); *B29K 2105/04* (2013.01); *B29K 2105/0872* (2013.01); *B29K 2277/00* (2013.01); *B29K 2309/08* (2013.01); *B29L 2031/3041* (2013.01)

(58) Field of Classification Search

CPC ....... B29C 43/28; B29C 43/361; B29C 43/44; B29C 2045/467; B29C 45/561

See application file for complete search history.

(56) References Cited

U.S. PATENT DOCUMENTS

| | | | |
|---|---|---|---|
| 2009/0096127 | A1 | 4/2009 | Schilles |
| 2010/0295329 | A1 | 11/2010 | Sapak et al. |
| 2011/0221091 | A1 | 9/2011 | Lapadula et al. |
| 2017/0001670 | A1 | 1/2017 | Grüneklee et al. |
| 2017/0080617 | A1 | 3/2017 | Ingemar et al. |
| 2018/0200925 | A1 | 7/2018 | Bahr et al. |
| 2019/0152100 | A1 | 5/2019 | Rübsam et al. |

FOREIGN PATENT DOCUMENTS

| | | | |
|---|---|---|---|
| EP | 0497335 | A2 | 8/1992 |
| EP | 0623443 | A1 | 11/1994 |
| IT | 101999900736574 | A1 | 8/2000 |
| IT | 20000443 | A1 | 11/2001 |
| IT | 20010400 | A1 | 10/2002 |
| WO | 2015124660 | A1 | 8/2015 |
| WO | 2016077773 | A1 | 5/2016 |
| WO | 2019238621 | A1 | 12/2019 |
| WO | 20210074004 | A1 | 4/2021 |

PRESSURE MOULDING PROCESS AND RELATED PRESSURE MOULDING DEVICE

TECHNICAL FIELD OF THE INVENTION

The present invention relates to a pressure moulding process and related pressure moulding device for the manufacture of an article for motor-vehicles, such as for example interior trims.

STATE OF THE ART

It is known to manufacture articles for motor-vehicles, such as for example interior trims (such as covering panels for doors, for dashboards, for uprights, etc.), which comprise a substrate (having structural function) made of composite material and a coating layer (typically polymeric, e.g., TPO, or made of fabric) firmly bonded to the substrate. The composite material can comprise a (typically thermoplastic) polymeric matrix and a plurality of reinforcing fibers (for example natural fibers and/or glass fibers and/or carbon fibers) embedded in, or (at least partially) impregnated by, the polymeric matrix. Examples of composite material used for the manufacture of these articles for motor-vehicles are NFPP (Natural-Fiber-Poly-Propylene) comprising a non-woven fabric made of natural fibers impregnated with polypropylene, or the "organo-sheet" composites, comprising glass/carbon/aramides fibers embedded in the polymer matrix.

SUMMARY OF THE INVENTION

In the field of the processes for manufacturing the aforesaid articles for motor-vehicles, it is known to make rigid functional structures made of polymeric material at the face of the substrate opposite to the coating layer. Such functional structures can for example perform structural functions, such as reinforcing/stiffening ribs, or they can perform coupling functions of the finished article, such as inserts to facilitate the assembly of the article on the vehicle. The functional structures (in particular the reinforcing ribs) allow to decrease the volume of material used to make the substrate (and consequently decrease the weight of the substrate) without however decreasing the mechanical properties of the finished article, as the functional structures absorb most of the loads to which the finished article is subjected during use.

Various types of processes are known to produce these types of articles.

It is known, for example, to position the substrate in a first moulding device in which the forming of the substrate and the injection of polymeric material on one face of the substrate to create the functional structures are performed. The polymeric material is injected in the molten/softened state into suitable injection cavities obtained in one half-mould and which open on the aforesaid face of the substrate. The physical/chemical compatibility between the substrate and the injected polymeric material allows the firm bond between the substrate and functional structures, once the polymeric material has cooled. Subsequent to the extraction of the substrate from the first device, it is known to position the substrate injected with polymeric material in a second moulding device in which the coupling with a coating sheet (which forms the coating layer) and the forming of the coating sheet are carried out, in case the latter has not already been formed.

Alternatively, it is known to firstly position the substrate and the coating sheet in a first moulding device in which the forming and the coupling are performed at the same time. The substrate and the coating sheet, firmly coupled, are subsequently positioned in a second moulding device, in which the injection of polymeric material is performed, as explained above.

The Applicant has found that in the known processes for manufacturing the aforesaid articles for motor-vehicles, the use of two distinct moulding devices increases the complexity of the process, thus lengthening the process times and/or increasing the process costs (investment and/or operational costs).

Furthermore, for the processes in which the coupling of the coating sheet to the substrate is performed downstream of the injection, it is necessary that (also) the second moulding device has a support surface counter-shaped to the functional structures previously created on the substrate. This implies that the second moulding device has to be made to measure for the particular article to be produced, making the process further complicated and expensive.

The Applicant has therefore faced the problem of reducing the complexity of the process for manufacturing articles for motor-vehicles, with consequent reduction of time and/or costs, while ensuring the desired mechanical and/or aesthetic properties of the finished article.

According to the Applicant, this problem is solved by a pressure moulding process which uses a single pressure moulding device for carrying out the forming of the substrate and of the coating sheet, the coupling between the substrate and coating sheet and the injection of polymeric material to create the functional structures.

According to an aspect the invention relates to a pressure moulding process for manufacturing an article.

Preferably the process comprises:

providing a substrate made of a composite material comprising a first (thermoplastic) polymeric material and fibres impregnated with said first polymeric material;

providing a coating sheet;

heating said substrate to a temperature of said substrate greater than 160° C.;

subsequently, during a first compression step, compressing under pressure said substrate and said coating sheet between a first conformation surface and a second conformation surface for conforming said substrate and said coating sheet and for firmly fixing said substrate and said coating sheet to each other;

during a second compression step subsequent to said first compression step, compressing under pressure said substrate and said coating sheet between said first and second conformation surface and injecting a (softened/melted) second polymeric material in an injection cavity having an outlet mouth onto said first conformation surface, wherein a first face of said substrate opposite to said coating sheet is in contact with said first conformation surface;

cooling said second polymeric material for firmly fixing said second polymeric material to said first face of the substrate.

Preferably, during said first compression step (and preferably also during said second compression step), a temperature of said first and second conformation surface is less than 120° C.

According to an aspect the invention relates to a pressure moulding device. Preferably the pressure moulding device comprises:

a first half-mould having a first conformation surface and a second half-mould having a second conformation surface, said first half-mould comprising an injection cavity having an outlet mouth onto said first conformation surface; and an injection unit in fluid communication with said injection cavity.

The Applicant believes that the feature according to which both the conformation surfaces are relatively cold (temperature below 120° C.) allows to cool down the substrate and the coating sheet during the first compression step, during which the substrate and the coating sheet are conformed and fixed to each other (thanks also to the initial temperature at least of the substrate which is sufficiently hot). This entails that, when in the subsequent step the second polymeric material is injected on the first face of the substrate to create the functional structures, the coating sheet is cold enough to be in a state of greater stiffness and hardness with respect to the condition it has at least at the beginning of the first compression step (i.e., wherein the forming occurs), in which the coating sheet is at a relatively high temperature, at least because it is in contact with, or in close proximity to, the substrate at a temperature greater than 160° C. This higher stiffness and hardness of the coating sheet allows to limit, or avoid, the risk of damaging the coating sheet due to the compression exerted during the injection of the polymeric material, due for example to the (high) injection pressure of the second polymeric material.

In this way it is advantageously possible to perform the forming, the coupling and (subsequently) the injection of the second polymeric material inside a single moulding device, while maintaining the desired quality of the finished article (in terms of aesthetic properties).

The present invention in one or more of the above aspects can have one or more of the following preferred features.

Preferably it is provided positioning at least one portion of said outlet mouth at a first distance from said second conformation surface during said first compression step, and at a second distance from said second conformation surface during said second compression step, said second distance being smaller than said first distance.

Preferably a difference between said first and second distance is greater than or equal to 0.5 mm, more preferably greater than or equal to 1 mm, and/or less than or equal to 4 mm, more preferably less than or equal to 3 mm.

By positioning the outlet mouth in the second compression step closer to the second conformation surface than in the first step, it is possible, on one hand, to conform and fix the substrate and the coating sheet to each other during the first compression step, while avoiding that the sudden pressure change at the perimeter of the outlet mouth (determined by the passage from a solid of the first conformation surface to a void of the outlet mouth) imprints an aesthetic mark on the hot coating sheet. On the other hand, this solution helps to avoid, during the injection of the second polymeric material, losses outside the volume defined by the injection cavity, without the higher compression on the coating sheet damaging the latter, which is at a sufficiently low temperature. This is particularly advantageous in case the coating sheet is made of not very resistant materials, such as for example TPO (Thermoplastic Polyolefin) or imitation leather (i.e., a material with mechanical and/or tactile and/or aesthetic properties that recall the natural leather).

Typically, said first half-mould and said second half-mould are movable relative to each other along a movement direction (coincident with an opening/closing direction of the mould). Typically, said first and second half-mould respectively have a first and a second main body which at least partially define respectively said first and second conformation surface. Typically, during the first and second compression step, the first and second half-moulds are thrusted against each other.

In one embodiment said positioning said at least one portion of said outlet mouth at the second distance comprises, between the first and the second compression step, reciprocally moving said first and second half-mould (preferably along the movement direction) for arranging them in the second compression step at a smaller distance from each other (preferably along said movement direction) than in the first compression step.

Preferably said moulding device comprises (at least) a spacer movable between:

a first position in which is interposed in contact between said first and second half-mould, when thrusted against each other, for keeping said at least one portion of said outlet mouth at said first distance from the second conformation surface, and a second position in which leaves free said first and second half-mould, when thrusted against each other, for keeping said at least one portion of said outlet mouth at said second distance from the second conformation surface.

Preferably it is provided:

during the first compression step, keeping said spacer in said first position;

between the first and the second compression step, moving said spacer to said second position; and during the second compression step, keeping said spacer in said second position.

In this way, the mutual position of the two half-moulds is effectively and simply modified, in order to move the portion of outlet mouth from the first to the second distance and vice versa, even when such portion of outlet mouth belongs to a respective portion of injection cavity integral with the first main body. In particular, the Applicant has realized that the mutual movement of the first and second half-moulds to arrange them in the second compression step at a distance smaller than in the first compression step is particularly effective for varying the aforesaid distance of the outlet mouth, in case the portion of outlet mouth is located on a portion of the first conformation surface developing substantially transversely to the movement direction.

In one embodiment, said positioning said at least one portion of said outlet mouth at the second distance comprises, between the first and the second compression step, moving away (e.g., by rigid translation) said at least one portion of said outlet mouth from said first main body.

Preferably said first half-mould comprises an insert integral with (a portion of) said injection cavity (comprising said at least one portion of outlet mouth). Preferably said insert is movable with respect to said first main body between:

a respective first position in which said at least one portion of said outlet mouth is at said first distance from the second conformation surface, and a respective second position in which said at least one portion of said outlet mouth is at said second distance from the second conformation surface.

Preferably it is provided:

during the first compression step, keeping said insert in said respective first position, between the first and the second compression step, moving said insert to said respective second position, and during the second compression step, keeping said insert in said respective second position.

In this way it is possible to efficiently and simply move the outlet mouth from the first to the second distance, even in case the portion of outlet mouth is on a portion of the first conformation surface having development substantially parallel to the movement direction. The Applicant has in fact realized that, in such conditions, if the outlet mouth remains integral with the first main body (i.e., the injection cavity was defined by the first main body), the mutual approach of the two half-moulds alone would produce a little, or no, change of the distance between the outlet mouth and the second conformation surface.

Preferably (at least one portion of) said outlet mouth is peripherally surrounded by a sealing element protruding from said first conformation surface. The sealing element helps to avoid losses of the second polymeric material on the first face, outside the injection cavity.

Preferably said pressure moulding device comprises an abutment element which defines a first and a second abutment surface.

Preferably said first and second half-mould comprise respectively a first and a second abutment support having a respective abutment face (and exemplarily respectively integral to said first and second main body).

Preferably said first abutment surface faces the abutment face of the first abutment support and said second abutment surface faces the abutment face of the second abutment support.

Typically, said first and second abutment surface and said respective abutment faces are external to said first and second conformation surfaces. In this way the correct forming of the substrate and of the coating sheet according to the geometry of the desired article is obtained.

Preferably, previously to said first compression step, it is provided:

arranging said substrate at said first conformation surface and positioning a perimetral portion of the substrate between said first abutment surface and said abutment face of said first abutment support;

arranging said coating sheet at a second face of said substrate opposite to the first face, and positioning a perimetral portion of the coating sheet on said second abutment surface.

Typically, when said first and second half-mould are thrusted against each other, said perimetral portion of the coating sheet is interposed between said second abutment surface and said abutment face of the second abutment support.

Preferably, before said second compression step (e.g., before said first compression step during a mutual approaching of said first and second half-moulds), it is provided moving along a cutting direction (preferably parallel to the movement direction of the two half-moulds) said abutment element with respect to the first main body (e.g., by lowering, along the movement direction, the second half-mould which thrusts against the abutment element) for cutting said substrate along a first cutting line through cooperation between (an edge of) said first abutment surface and (a perimetral edge of) said first conformation surface, and moving said second abutment support (integral to said second main body) with respect to the abutment element for cutting said coating sheet along a second cutting line through cooperation between the abutment element and the second abutment support. In this way, within the single pressure moulding device, it is also possible to carry out the cutting of the substrate (e.g., along the perimeter of the first conformation surface) and of the coating sheet, in order to favour a greater completeness and/or simplicity and/or economy (in terms of costs and/or times) of the process.

Preferably the first cutting line is more proximal to said edge of the first conformation surface than said second cutting line. In this way, following the cutting, the coating sheet exceeds the substrate along at least one portion of the perimetral edge of the substrate, which favours the subsequent aesthetic wrapping of the coating sheet on the substrate.

Preferably, during the second compression step, a temperature of said coating sheet is less than or equal to 90° C., more preferably less than or equal to 80° C., even more preferably less than or equal to 70° C. In this way the coating sheet has high stiffness and hardness.

Preferably said temperature of said substrate is greater than or equal to 170° C., more preferably greater than or equal to 180° C., and/or less than or equal to 250° C.

Preferably, previously to the first compression step, it is provided heating said coating sheet to a temperature of said coating sheet greater than or equal to 120° C., more preferably greater than or equal to 140° C., and less than or equal to 220° C., more preferably less than or equal to 200° C. In this way, the forming and/or the fixing of the coating sheet during the first compression step is facilitated since the heating of the coating sheet favours its plastic deformation and/or softening, without the risk of loss of the aesthetic properties of the coating sheet.

Preferably, during said first and/or second compression step, said (preferably constant) temperature of said first and second conformation surface is less than or equal to 110° C., more preferably less than or equal to 90° C., even more preferably less than or equal to 60° C., and greater than or equal to 30° C., more preferably greater than or equal to 40° C. In this way it is possible to quickly and efficiently allow the cooling of the substrate and of the coating sheet.

In one embodiment, previously to said first compression step, it is provided providing an adhesive layer between said substrate and said coating sheet. In this way the efficient coupling between substrate and coating sheet is allowed, even in case there is no (high) chemical affinity between substrate and coating sheet.

Preferably said first polymeric material is selected from the group: polyolefins, polyesters, polyamides, polyurethanes, or mixtures thereof. Preferably said first polymeric material is a polyolefin, more preferably polyethylene and/or polypropylene, even more preferably polypropylene.

Preferably said fibers are selected from: natural fibers, polymeric fibers (e.g., nylon, polyethylene, aramides, polyester), glass fibers, carbon fibers. Preferably said fibers are natural textile fibers, more preferably selected from the group: cotton, hemp, jute, linen.

In one particularly preferred embodiment, said composite material is NFPP (Natural-Fiber-Poly-Propylene) or GFPP (Glass-Fiber-Poly-Propylene). The Applicant has in fact realized that the aforesaid process is particularly suitable for such materials.

Preferably said composite material has a weight per unit area ('grammage') greater than or equal to 300 $g/m^2$, more preferably greater than or equal to 400 $g/m^2$, even more preferably greater than or equal to 500 $g/m^2$, and/or less than or equal to 4000 $g/m^2$, more preferably less than or equal to 3500 $g/m^2$, even more preferably less than or equal to 3000 $g/m^2$. In this way it is possible to provide high structural properties to the composite material and furthermore the composite material is particularly suitable for the aforesaid process.

In one embodiment said coating sheet is made of textile material, more preferably non-woven fabric and/or woven fabric (e.g., weft and warp fabric or knitted fabric, e.g., weft/warp knitted fabric). Said textile material is preferably made of natural fiber, more preferably selected from: cotton, silk, linen, wool, etc., or made of synthetic fiber, more preferably selected from: polyamide (e.g., nylon), polyethylene, polypropylene, polyester (e.g., PET), polyurethane, aramidic, acrylic etc.

In one embodiment, said coating sheet comprises a first layer made of woven fabric and a second layer (typically interposed between said first layer and said substrate in the finished article) made of non-woven fabric, more preferably made of polyester.

Preferably said second layer has a weight per unit area greater than or equal to 30 $g/m^2$, more preferably greater than or equal to 40 $g/m^2$, even more preferably greater than or equal to 50 $g/m^2$, and/or less than or equal to 400 $g/m^2$, more preferably less than or equal to 350 $g/m^2$, even more preferably less than or equal to 300 $g/m^2$.

The Applicant has in fact realized that the coating sheet with double textile layer is particularly suitable for the aforesaid process, wherein the non-woven fabric helps to protect the woven fabric.

In one embodiment said coating sheet has continuous structure and preferably is (at least partially) made of polymeric material selected from: thermoplastic polyolefins (TPO), polyurethane (PU), polyvinyl chloride (PVC), polyethylene (PE), polypropylene (PP).

In one particularly preferred embodiment, said coating sheet is a single sheet with homogeneous structure entirely made of thermoplastic polyolefin (TPO).

Preferably said single sheet has a thickness greater than or equal to 0.1 mm and/or less than or equal to 4 mm, more preferably less than or equal to 3 mm, even more preferably less than or equal to 2 mm.

The Applicant has realized that this sheet is particularly suitable for the aforesaid process in order to manufacture a hard-touch coating.

In one embodiment said coating sheet comprises (or consists of) a first sheet layer with homogeneous structure entirely made of thermoplastic polyolefin (TPO) and a second layer (preferably soft, and interposed between said sheet and said substrate in the finished article). Preferably said second layer is made of a polymeric foam, more preferably a polyolefin foam, even more preferably a polypropylene (PP) foam.

Preferably said second layer has a thickness greater than or equal to 0.5 mm, more preferably greater than or equal to 1 mm, and/or less than or equal to 5 mm, more preferably less than or equal to 4 mm. Preferably said second layer has a density greater than or equal to 20 $kg/m^3$, more preferably greater than or equal to 30 $kg/m^3$, and/or less than or equal to 300 $kg/m^3$, more preferably less than or equal to 250 $kg/m^3$, even more preferably less than or equal to 200 $kg/m^3$. Preferably said first sheet layer with homogeneous structure has a thickness greater than or equal to 0.1 mm and/or less than or equal to 4 mm, more preferably less than or equal to 3 mm, even more preferably less than or equal to 2 mm. The Applicant has realized that this coating sheet with double-layer is particularly suitable for the aforesaid process in order to manufacture a soft-touch coating.

In one embodiment said coating sheet comprises a textile layer spread with and/or impregnated with a polymeric material (e.g., polyurethane or polyvinyl chloride), as in the case of imitation leather, for example Feel Tek™ (marketed by Mario Levi S.p.a.), Alcantara™, Ultrasuede™. Preferably said textile layer is woven fabric or knitted fabric or non-woven fabric, preferably made of synthetic textile fibers (e.g., polyester, aramides, etc.) or natural textile fibers (e.g., cotton, wool).

DETAILED DESCRIPTION OF SOME EMBODIMENTS OF THE INVENTION

The features and advantages of the present invention will be further clarified by the following detailed description of some embodiments, presented by way of non-limiting example of the present invention, with reference to the attached figures.

In the figures, the reference number 100 indicates a pressure moulding device according to the present invention, which can be used for example for the moulding of articles for motor-vehicles, such as for example interior trims.

Figure 3:
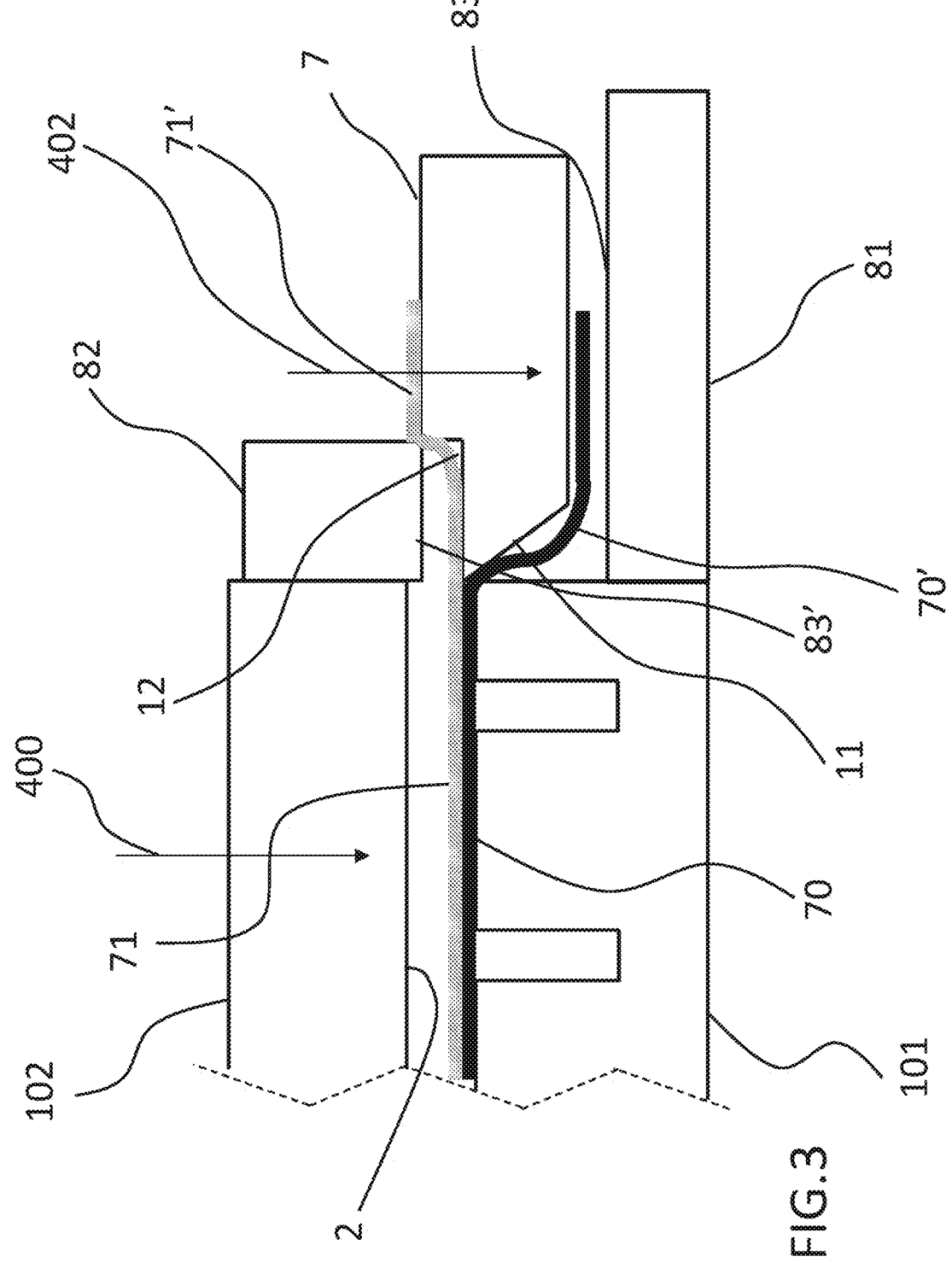

The moulding device 100 comprises a mould formed by a first half-mould 91 having a first conformation surface 1 and a second half-mould 92 having a second conformation surface 2 (visible in FIG. 3). Typically, the first 91 and the second half-mould 92 have respectively a first 101 and a second main body 102 which at least partially define respectively the first 1 and the second conformation surface 2.

Typically, the moulding device 100 also comprises a movement system of the two half-moulds 91 and 92 in order to open/close the mould, which is not shown as for example of known type. The first 91 and the second half-mould 92 are exemplarily mutually movable along the (e.g., vertical) movement direction 400.

The first half-mould 91 also comprises an injection cavity 3 having an outlet mouth 4 on the first conformation surface 1.

Figure 1:
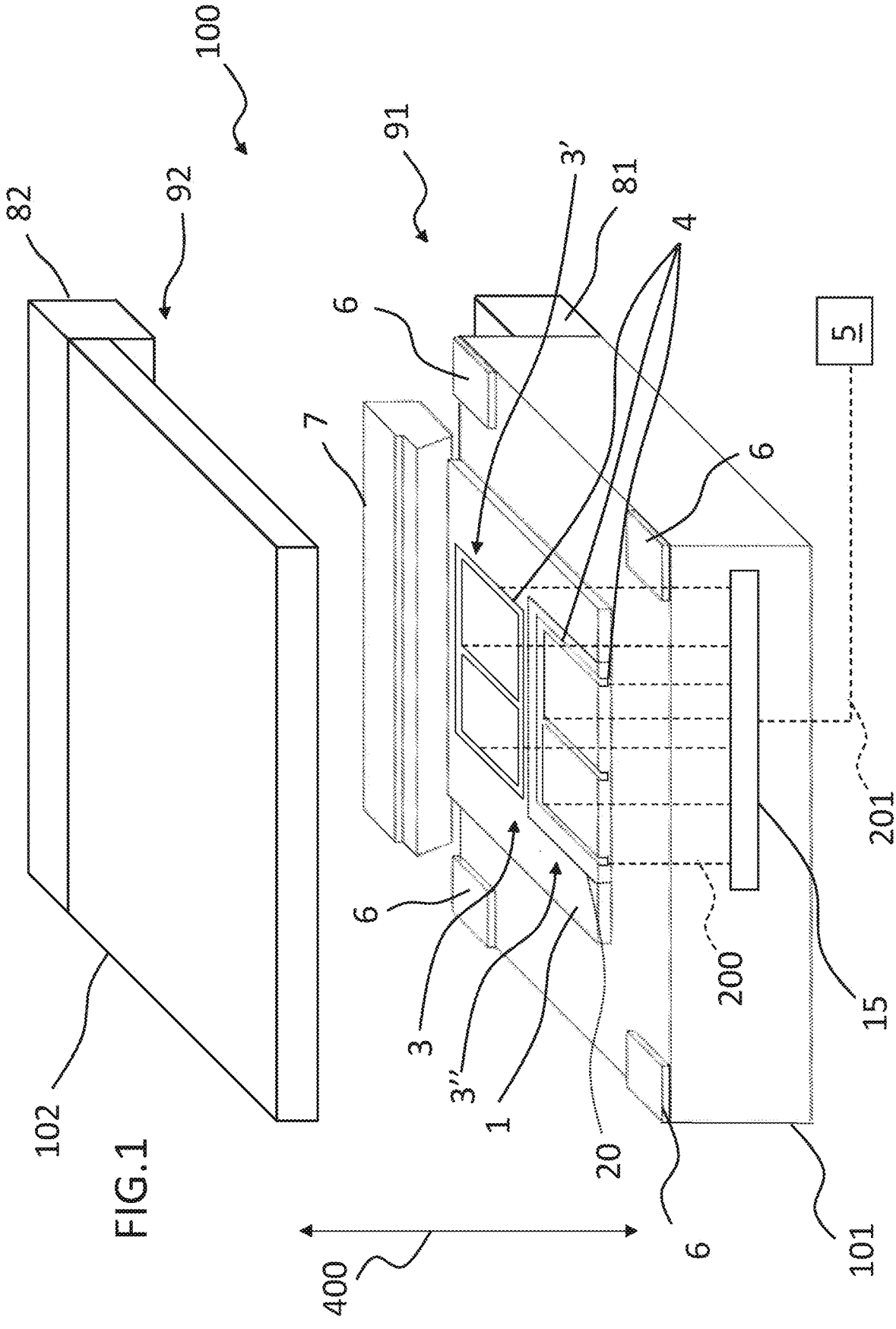
FIG. 1 shows a perspective, schematic and partial view of a moulding device according to one embodiment of the present invention.

The injection cavity 3 (only schematically shown in the figures) can consist of sub-portions, each sub-portion being an interconnected structure (i.e., each part is in fluid communication with every other part), for example forming a reticular structure. In the example of FIG. 1, a first 3' and a second sub-portion 3" of the injection cavity 3 are shown.

Exemplarily (for illustrative purposes) the first sub-portion 3' has the outlet mouth entirely on a portion of the first conformation surface 1 having development transversal to the movement direction 400 (i.e., in the shown example, substantially horizontal development), and the second sub-portion 3" has a part of the respective outlet mouth on a portion of the first conformation surface 1 having development parallel to the movement direction 400 (i.e., in the shown example, on a wall with substantially vertical development). One or more sub-portions of the injection cavity can have the respective outlet mouth having only vertical development (not shown).

Figure 6:
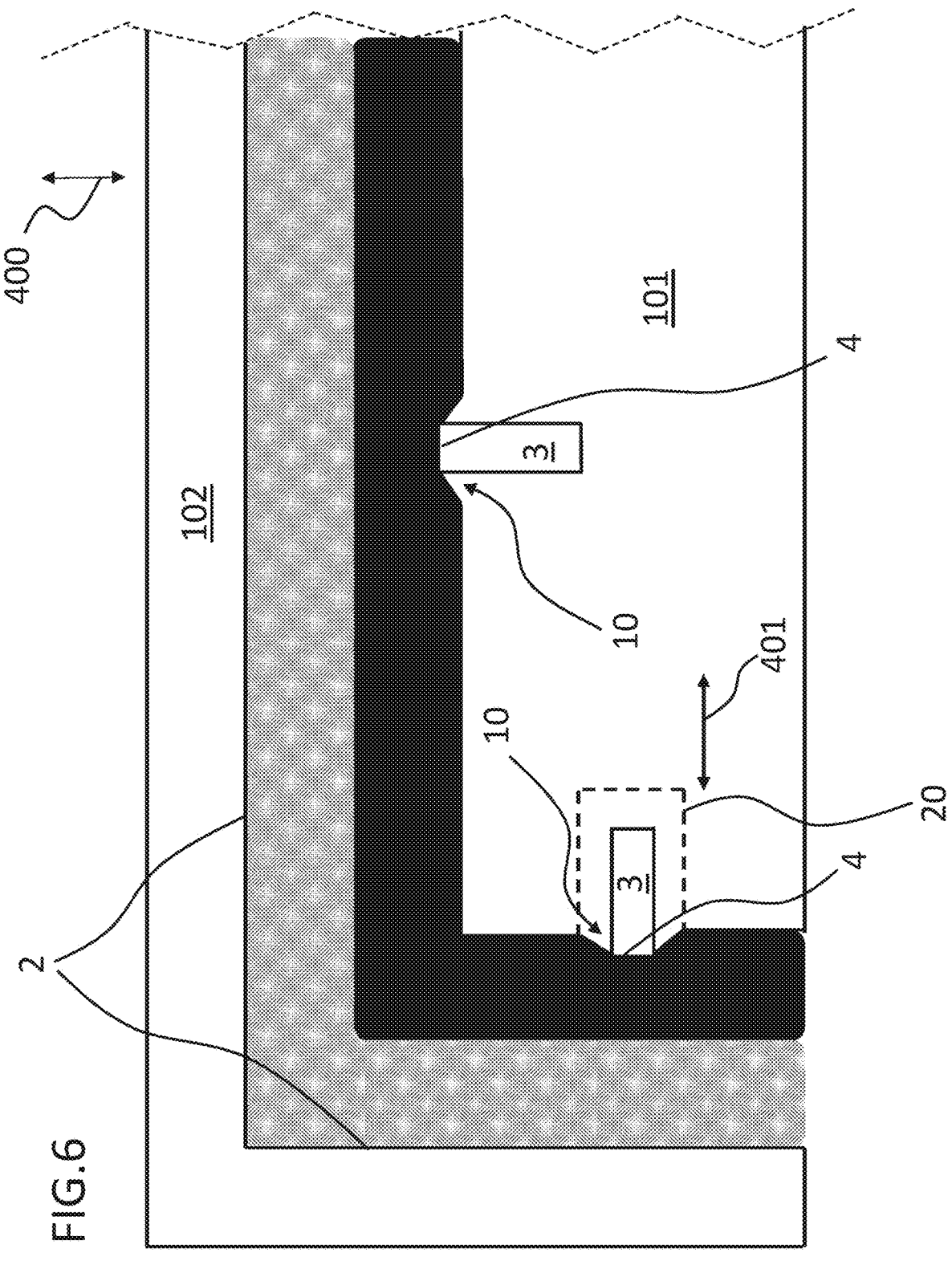
FIG. 6 schematically and partially shows a sectional view of one embodiment of the moulding device according to the present invention.

Exemplarily the outlet mouth 4 is peripherally surrounded by a sealing element 10 (schematically and not to scale shown in FIG. 6) protruding from the first conformation surface 1. For example, every overall outlet mouth of each sub-portion of the injection cavity is completely surrounded by a continuous element 10 in slight relief (e.g., a few tenths of a millimetre) with respect to the rest of the conformation surface. In FIG. 6 the relief is shown in a purely schematic and accentuated way for illustrative purposes.

In one embodiment, the outlet mouth is (in whole or in part) without the sealing element. In other words, the perimeter of the outlet mouth 4 is at the same level as the rest of the first conformation surface.

Exemplarily the first sub-portion 3' of the injection cavity 3 and the respective outlet mouth 4 (and, if present, the respective sealing element 10) are integral with the first main body 101.

Exemplarily the first half-mould 91 comprises one or more inserts 20 movable with respect to the main body 101. In the example of FIG. 1 the movable insert 20 is integral with the second sub-portion 3" of the injection cavity 3.

FIG. 6 schematically shows an insert 20, movable with respect to the first main body 101, exemplarily along a direction 401 perpendicular to the local development of the first conformation surface (horizontal in the example). The insert 20 is movable between a first position (shown in FIG. 6) in which keeps the respective outlet mouth 4 (and also the respective sealing element 10) at a first distance from the second conformation surface 2, and a second position (not shown) in which keeps the outlet mouth 4 at a second distance from the second conformation surface 2, which is smaller than the first distance (i.e., it is slightly more to the left than shown in FIG. 6). Exemplarily the moulding device 100 comprises a movement system (not shown) of the insert 20, for example of the mechanical type (e.g., a plate sliding along a direction parallel to the movement direction 400 which abuts against the bottom surface of the insert 20 and determines its movement along the direction 401) or electrical type (e.g., a linear electric actuator), herein not further described as for example of known type.

The present invention also contemplates solutions, not shown, in which one or more inserts are movable with respect to the first main body along any direction, for example parallel to the movement direction 400 of the two half-moulds.

With reference to FIG. 1, exemplarily the moulding device 100 also comprises four spacers 6, exemplarily plate-like shaped and having a thickness (along the direction 400) equal for example to about 2 mm. Exemplarily the spacers 6 are movable between a first position (shown in FIG. 1) in which they are interposed in contact between the first 91 and the second half-mould 92, when thrusted against each other (not shown), and a second position (shown in FIG. 5) in which they leave free the first 91 and the second half-mould 92, when thrusted against each other. Exemplarily the moulding device 100 comprises a (respective) movement member (not shown) of the spacers 6, for example of mechanical or electrical type (e.g., a hydraulic or pneumatic cylinder, or a linear electric actuator).

Therefore, with the spacers 6 in the respective second position, the distance between the conformation surfaces 1 and 2 taken along the thickness of the spacers is smaller than when the spacers 6 are in the respective first position.

Figure 2:
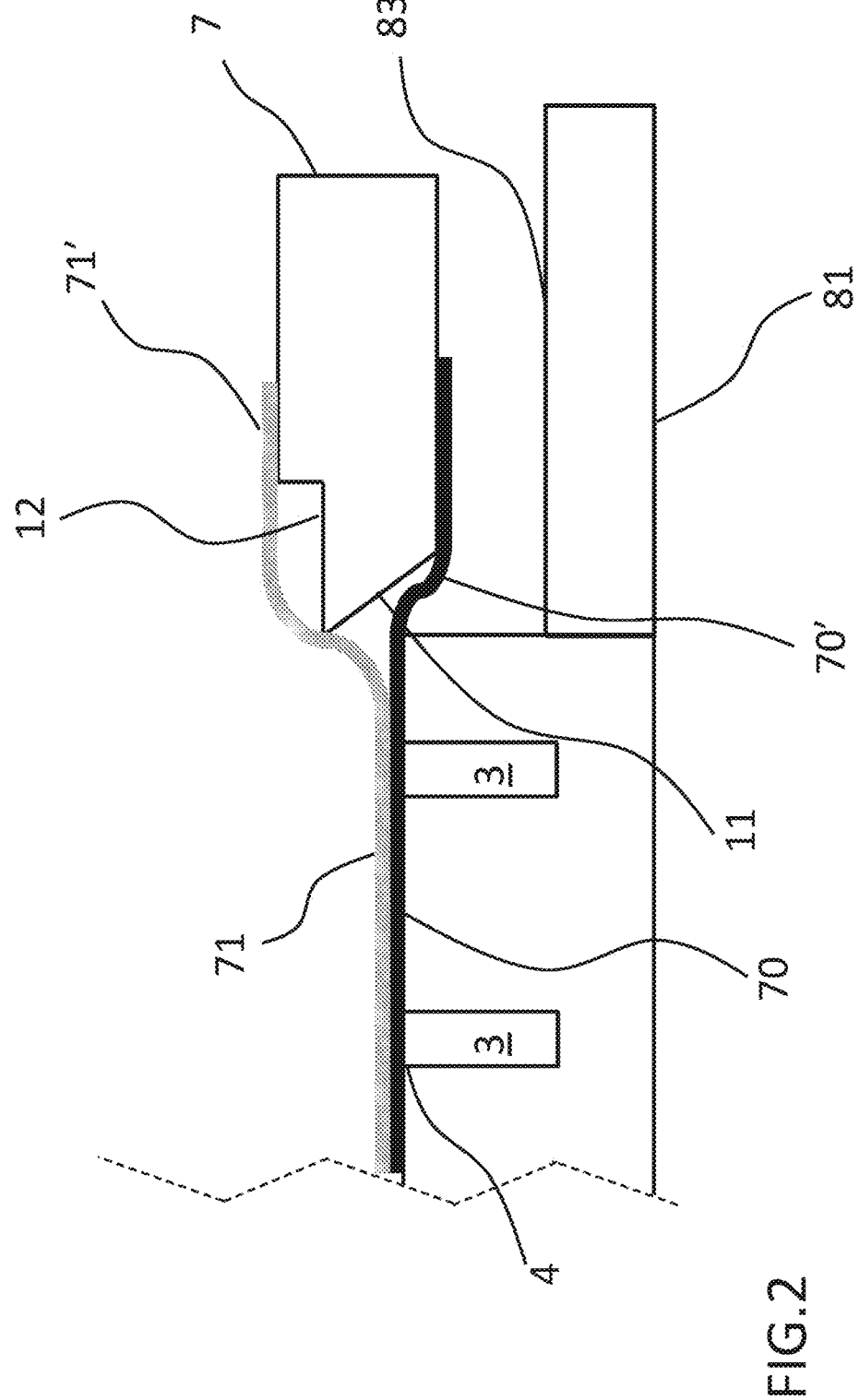
FIGS. 2-4 schematically show subsequent steps of one example of moulding process according to the present invention.
Figure 4:
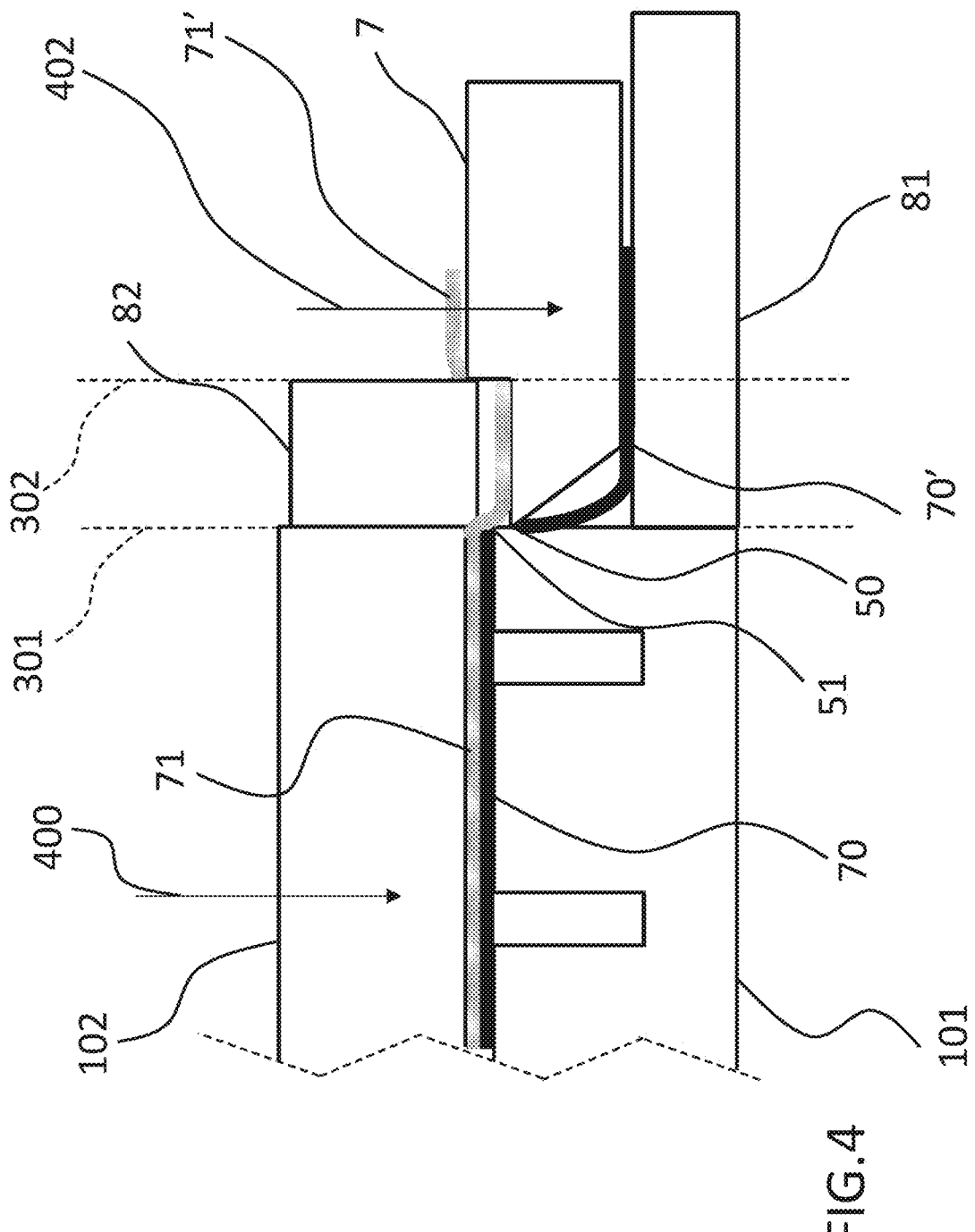

Exemplarily the moulding device 100 also comprises an abutment element 7 which defines a first 11 and a second abutment surface 12 (exemplarily shown in section in FIGS. 2-4).

Exemplarily the first 91 and the second half-mould 92 respectively comprise also a first 81 and a second abutment support 82 having a respective abutment face 83, 83' (FIGS. 2-4).

Exemplarily the first 81 and second abutment support 82 are integral (e.g., in single piece) respectively with the first 101 and the second main body 102. Alternatively, the first 81 and the second abutment support 82 can be (physically) distinguished from respectively the first 101 and second main body 102, and for example can be connected to a respective movement system of mechanical type (e.g., a respective cylinder) or electrical type (e.g., a respective linear electric actuator) which allows their independent movement along a respective movement direction parallel to the movement direction 400.

As shown in FIGS. 3-4, exemplarily the first abutment surface 11 faces the abutment face 83 of the first abutment support 81 and the second abutment surface 12 faces the abutment face 83' of the second abutment support 82.

The first 11 and second abutment surface 12 and the respective abutment faces 83 and 83' are external to the two conformation surfaces 1 and 2.

The moulding device 100 comprises also an injection unit 5 in fluid communication with the injection cavity 3. The injection unit 5 exemplarily comprises (not shown) a helical extruder equipped with a hopper for feeding the polymeric material to be injected, a heating system of the extruder, and an injection cylinder. This injection cylinder is connected (e.g., by a fluid line 201) to a hot chamber 15 located for example in the first main body 101 and which, in turn, is in fluid communication with the injection cavity 3 (e.g., with specific injection points of the injection cavity, for example via a duct system 200). For example, the injection of the polymeric material from the chamber 15 to the injection cavity 3 is controlled by a plurality of valve elements (e.g., shutters, placed along each duct 200).

With reference to FIGS. 1-6, some steps of an example of pressure moulding process according to the present invention are schematically shown, which can be implemented with the device 100 described above.

First of all, the moulding process comprises providing:
- a substrate 70 made of a composite material, for example NFPP comprising polypropylene as first thermoplastic polymeric material, and natural fibers (e.g., cotton) impregnated with the first polymeric material; and
- a coating sheet 71, for example having a homogeneous and continuous structure and exemplarily made of thermoplastic polyolefin (TPO).

Optionally, it is possible to provide an adhesive layer (e.g., a heat-activable adhesive or a pressure sensitive adhesive) between the substrate 70 and the coating sheet 71.

Subsequently, the process comprises heating the substrate 70 (and optionally also the coating sheet 71) to a temperature for example of about 200° C. (and respectively about 180° C.), for example by hot plates and/or by infrared exposure.

At the end of the heating, the substrate 70 is positioned on the first conformation surface 1, so that a perimetral portion 70' of the substrate 70 is located between the first abutment surface 11 and the abutment face 83 of the first abutment support 81. The coating sheet 71 is exemplarily positioned superimposed on the substrate 70, so that a perimetral portion 71' of the coating sheet 70 is positioned on the second abutment surface 12. Typically (as shown in FIG. 3), when the first 91 and the second half-mould 92 are approaching and/or are thrusted against each other, the perimetral portion 71' of the coating sheet 71 is (partially)

interposed between the second abutment surface 12 and the abutment face 83' of the second abutment support 82.

Exemplarily (as shown in FIG. 3-4) during the mutual approach of the first 91 and second half-mould 92 (e.g., by lowering of the second half-mold) along the movement direction 400, the abutment element 7 is lowered with respect to the first main body 101 along a, exemplarily vertical, cutting direction 402 and the second abutment support 82 is lowered with respect to the abutment element 7. The movement of the abutment element 7 allows cutting the substrate 70 along a first cutting direction 301 by cooperation between an edge 50 of the first abutment surface 11 and a perimetral edge 51 of the first conformation surface 1. The movement of the second abutment support 82 allows cutting the coating sheet 71 along a second cutting line 302 by cooperation between the abutment element 7 and a respective edge of the second abutment support 82.

Exemplarily the first cutting line 301 is more proximal to the perimetral edge 51 of the first conformation surface 1 than the second cutting line 302. The first cutting line 301 exemplarily follows (at least in part) the perimeter of the first conformation surface 1.

In one alternative not shown embodiment, in which the first and the second abutment supports are distinct from the first and second main body, it is possible to firstly thrust the two half-moulds against each other and subsequently moving along the respective movement direction (e.g., parallel to the movement direction 400) also the first (and second) abutment support, by activation of the (respective) movement system (e.g., mechanical cylinders).

In one alternative not shown embodiment, one or both of the aforesaid cuts are performed, alternatively to the cooperation between two sharp edges as described above, by the pression of a respective blade against a respective abutment surface.

In one alternative not shown embodiment, when the two half-moulds are thrusted against each other, the perimetral cut of the substrate and of the coating sheet takes place along a same cutting line.

Exemplarily during all the steps of the moulding process described above and below, the two main bodies 101 and 102 of the half-moulds 91 and 92, including the first 1 and the second conformation surface 2, are thermostated (at a temperature for example of about 60° C. in the case of TPO, or of about 100-120° C. in case the coating sheet is made of polypropylene and has a thickness in the order of a few tenths of millimetre), for example by a cooling system comprising one or more cooling ducts that entirely pass through the respective main body and inside of which a cooling fluid flows (e.g., air or water).

The process comprises a first compression step, in which the first 91 and second half-mould 92 are thrusted against each other, and the substrate 70 and the coating sheet 71 are compressed under pressure between the first 1 and the second conformation surface 2 for forming and firmly fixing to each other the substrate 70 and the coating sheet 71.

Exemplarily during the first compression phase, the spacers 6 are kept in the first position and the one or more inserts 20 are kept in the respective first position.

Figure 5:
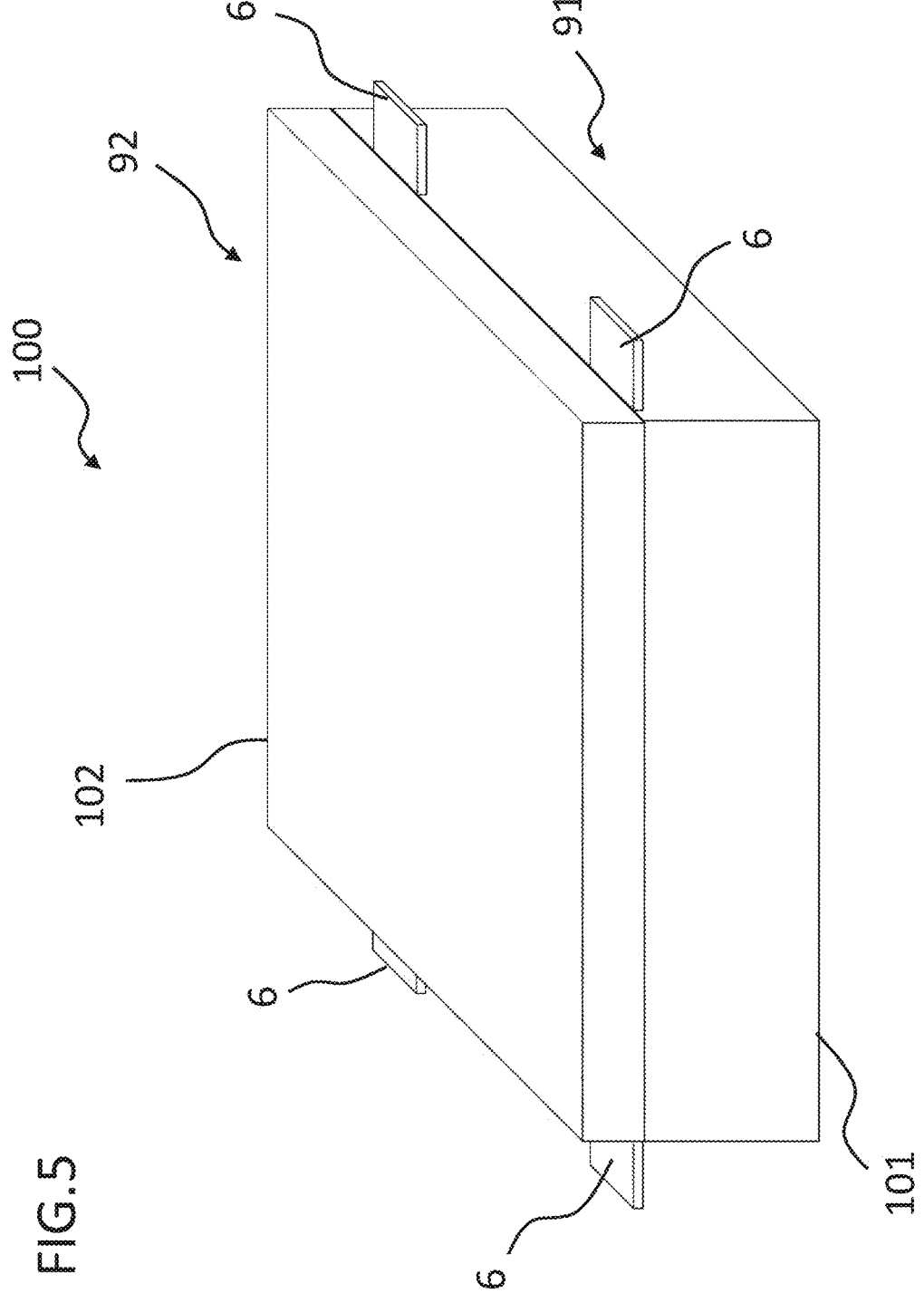
FIG. 5 shows a perspective, schematic and partial view of the moulding device of FIG. 1 in a step of the process according to the present invention.

At the end of the first compression step, the second half-mould 92 is slightly raised and the spacers 6 are moved in the second position (schematically shown in FIG. 5). In this way, when the second half-mould 92 is thrusted again against the first half-mould 91, the sub-portion of the outlet mouth 4 having horizontal development (and more generally having development substantially transversal to the horizontal plane, for example with slope between 0° and 45°) is in a position closer to the second conformation surface 2 than that in the first step.

Furthermore, the one or more inserts 20 are moved in the respective second position. In this way, the sub-portion of the outlet mouth 4 having vertical development (and more generally having development substantially vertical, for example with slope between 450 and 90° with respect to the horizontal) is in a position closer to the second conformation surface 2 than that in the first step.

With the spacers 6 and the one or more inserts 20 in the respective second position, the second half-mould 92 is again lowered and thrusted against the first half-mould 91 to carry out a second compression step in which the substrate 70 and the coating sheet 71 are compressed between the first 1 and the second conformation surface 2 to a generally greater extent with respect to the first compression step.

In this situation, the perimeter of the outlet mouth 4 (i.e., the transition area from a solid of the first conformation surface to a void of the outlet mouth) and, if present, the sealing element 10, penetrates in the substrate 70 to a greater extent than in the first compression step. Typically, the substrate 70 is sufficiently soft to accommodate the perimeter of the outlet mouth 4 and the eventual sealing element without being damaged.

During the second compression step, a second molten polymeric material, for example polypropylene, is injected (through the injection unit 5) into the injection cavity 3 up to contact the face of the substrate 70 opposite to the coating sheet 71.

Finally, the injected second polymeric material is cooled for firmly fixing itself to the substrate 70 and thus creating rigid functional structures, such as reinforcing/stiffening ribs or members to facilitate the assembly of the article on the vehicle.

Once the cooling of the second polymeric material is ended, it is possible to extract the finished article from the moulding device 100.

The invention claimed is:

1. A pressure moulding process for manufacturing an article, the process comprising:

providing a substrate made of a composite material comprising a first polymeric material and fibres impregnated with said first polymeric material;

providing a coating sheet;

heating said substrate to a temperature of said substrate greater than 160° C.;

subsequently, during a first compression step, compressing under pressure said substrate and said coating sheet between a first conformation surface and a second conformation surface for conforming said substrate and said coating sheet and for firmly fixing said substrate and said coating sheet to each other;

during a second compression step subsequent to said first compression step, compressing under pressure said substrate and said coating sheet between said first and second conformation surface and injecting a second polymeric material in an injection cavity having an outlet mouth onto said first conformation surface, wherein a first face of said substrate opposite to said coating sheet is in contact with said first conformation surface;

cooling said second polymeric material for firmly fixing said second polymeric material to said first face of the substrate, wherein the process comprises positioning at least one portion of said outlet mouth at a first distance from said second conformation surface during said first compression step, and at a second distance from said second conformation surface during said second compression step, said second distance being smaller than said first distance, and wherein a first half-mould having said first conformation surface and a second half-mould having said second conformation surface are movable relative to each other along a movement direction and respectively have a first and a second main body, which at least in part define respectively said first and second conformation surface.

2. The process according to claim 1, wherein a difference between said first and second distance is greater than or equal to 0.5 mm and/or less than or equal to 4 mm.

3. The process according to claim 1, wherein said positioning said at least one portion of said outlet mouth at the second distance comprises, between the first and the second compression step, reciprocally moving said first and second half-mould along the movement direction for arranging them in the second compression step at a smaller distance from each other along said movement direction than in the first compression step, and wherein the process comprises:

during the first compression step, keeping a spacer in a first position in which is interposed in contact between said first and second half-mould thrusted against each other, for keeping said at least one portion of said outlet mouth at said first distance from the second conformation surface;

between the first and the second compression step, moving said spacer to a second position; and during the second compression step, keeping said spacer in said second position in which leaves free said first and second half-mould, thrusted against each other, for keeping said at least one portion of said outlet mouth at said second distance from the second conformation surface.

4. The process according to claim 1, wherein said positioning said at least one portion of said outlet mouth at the second distance comprises, between the first and the second compression step, moving away said at least one portion of said outlet mouth from said first main body, wherein said first half-mould comprises an insert integral with a portion of said injection cavity comprising said at least one portion of outlet mouth, and wherein the process comprises:

during the first compression step, keeping said insert in a respective first position in which said at least one portion of said outlet mouth is at said first distance from the second conformation surface, between the first and the second compression steps, moving said insert to a respective second position; and during the second compression step, keeping said insert in said respective second position in which said at least one portion of said outlet mouth is at said second distance from the second conformation surface.

5. The process according to claim 1, comprising, previously to said first compression step:

arranging said substrate at said first conformation surface and positioning a perimetral portion of the substrate between a first abutment surface of an abutment element and an abutment face of a first abutment support;

arranging said coating sheet at a second face of said substrate opposite to the first face, and positioning a perimetral portion of the coating sheet on a second abutment surface of said abutment element, wherein, when said first and second half-mould are thrusted against each other, said perimetral portion of the coating sheet is interposed between said second abutment surface and an abutment face of a second abutment support, wherein, before said second compression step, the process comprises:

moving along a cutting direction said abutment element with respect to the first main body for cutting said substrate along a first cutting line through cooperation between an edge of said first abutment surface and a perimetral edge of said first conformation surface, and moving said second abutment support with respect to the abutment element for cutting said coating sheet along a second cutting line through cooperation between the abutment element and the second abutment support, and wherein the first cutting line is more proximal to said edge of the first conformation surface than said second cutting line.

6. The process according to claim 1, wherein said temperature of said substrate is greater than or equal to 170° C. and/or less than or equal to 250° C., wherein the process comprises, previously to the first compression step, heating said coating sheet to a temperature of said coating sheet greater than or equal to 120° C. and less than or equal to 220° C., and wherein during said first and/or second compression step, said temperature of said first and second conformation surfaces is less than or equal to 110° C. and greater than or equal to 30° C.

7. The process according to claim 1, wherein said first polymeric material is selected from the group: polyolefins, polyesters, polyamides, polyurethanes, or mixtures thereof, wherein said fibres are selected from: natural fibres, polymeric fibres, glass fibres, carbon fibres, wherein said composite material is NFPP having a weight per unit area greater than or equal to 300 g/m2 and/or less than or equal to 4000 g/m2, wherein said coating sheet has continuous structure and comprises a first sheet layer having homogeneous structure entirely made of thermoplastic polyolefin and a second layer made of a polymeric foam, and wherein said second layer has a thickness greater than or equal to 0.5 mm and/or less than or equal to 5 mm and a density greater than or equal to 20 kg/m3 and/or less than or equal to 300 kg/m3.

8. A pressure moulding device comprising:

a first half-mould having a first conformation surface and a second half-mould having a second conformation surface, said first half-mould comprising an injection cavity having an outlet mouth onto said first conformation surface, wherein said first and second half-mould have a first and a second main body respectively, which at least partly define said first and second conformation surface respectively;

an injection unit in fluid communication with said injection cavity, and a spacer movable between:

a first position in which is interposed in contact between said first and second half-mould, when thrusted against each other, for keeping at least one portion of said outlet mouth at a first distance from the second conformation surface, and a second position in which leaves free said first and second half-mould, when thrusted against each other, for keeping said at least one portion of said outlet mouth at a second distance from the second conformation surface, said second distance being smaller than said first distance.

9. The device according to claim 8, wherein said first half-mould comprises an insert integral with a portion of said injection cavity comprising a respective portion of said outlet mouth, and movable with respect to said first main body between:

a respective first position in which said respective portion of said outlet mouth is at a respective first distance from the second conformation surface, and a respective second position in which said respective portion of said outlet mouth is at a respective second distance from the second conformation surface said respective second distance being smaller than said respective first distance.

10. The device according to claim 8, comprising an abutment element which defines a first and a second abutment surface, wherein said first and second half-mould comprise respectively a first and a second abutment support, having a respective abutment face, wherein said first abutment surface faces the abutment face of the first abutment support and said second abutment surface faces the abutment face of the second abutment support, and wherein said first and second abutment surface and said respective abutment faces are external to said first and second conformation surfaces.

11. A pressure moulding device comprising:

a first half-mould having a first conformation surface and a second half-mould having a second conformation surface, said first half-mould comprising an injection cavity having an outlet mouth onto said first conformation surface, wherein said first and second half-mould have a first and a second main body respectively, which at least partly define said first and second conformation surface respectively;

an injection unit in fluid communication with said injection cavity, wherein said first half-mould comprises an insert integral with a portion of said injection cavity comprising a respective portion of said outlet mouth, and movable with respect to said first main body between:

a respective first position in which said respective portion of said outlet mouth is at a respective first distance from the second conformation surface, and a respective second position in which said respective portion of said outlet mouth is at a respective second distance from the second conformation surface, said respective second distance being smaller than said respective first distance.

* * * * *